May 13, 1969     R. P. OGDEN ET AL     3,444,352
ADJUSTABLE WELDING HEAD ARRANGEMENT
Filed June 12, 1968                                    Sheet 1 of 4
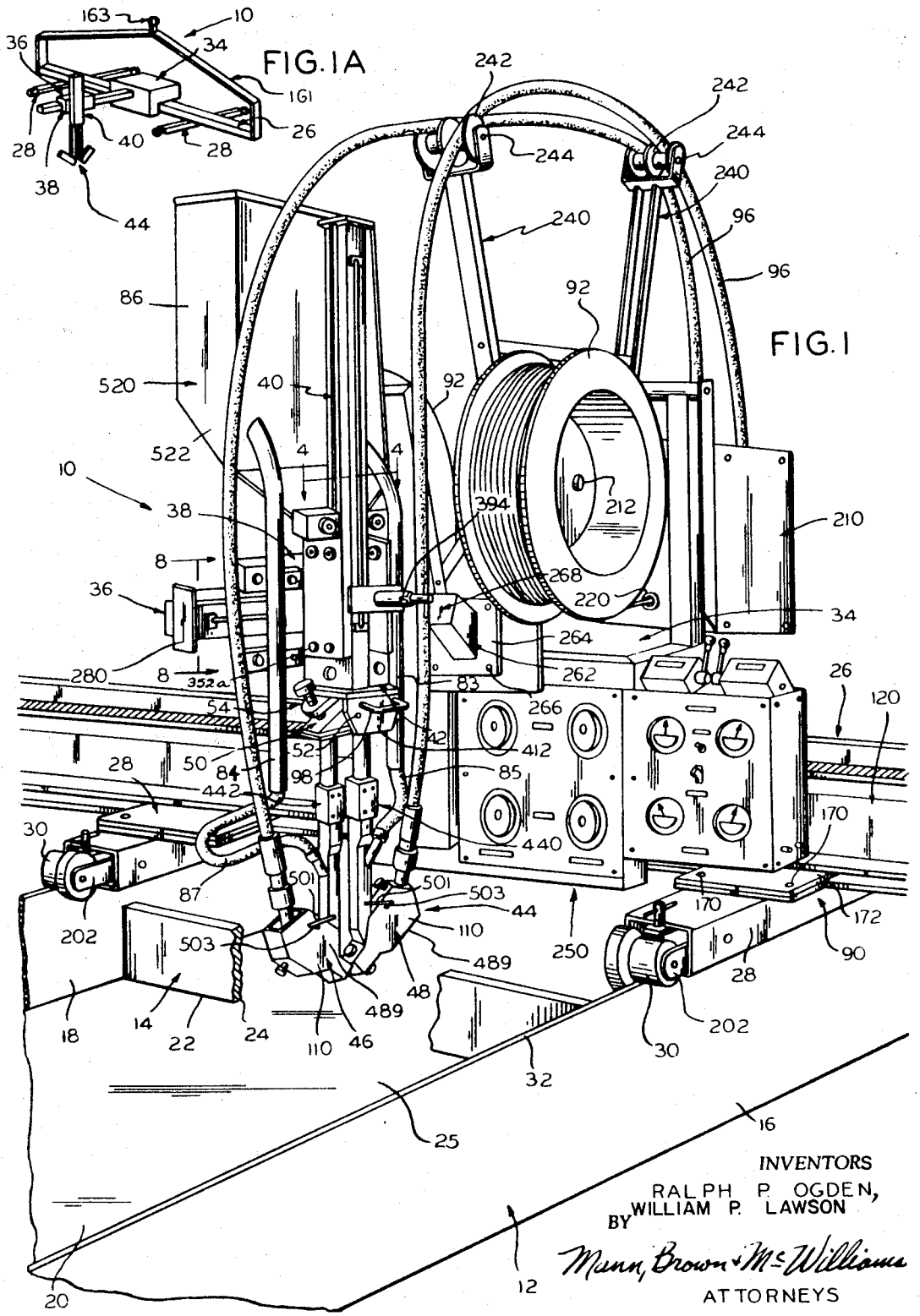
INVENTORS
RALPH P. OGDEN,
WILLIAM P. LAWSON
BY
Munn, Brown & McWilliams
ATTORNEYS

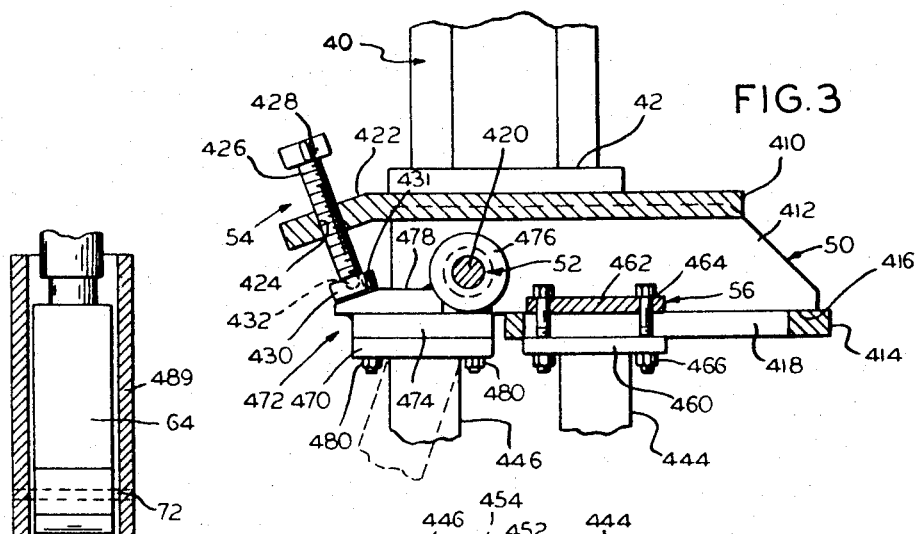
FIG. 3
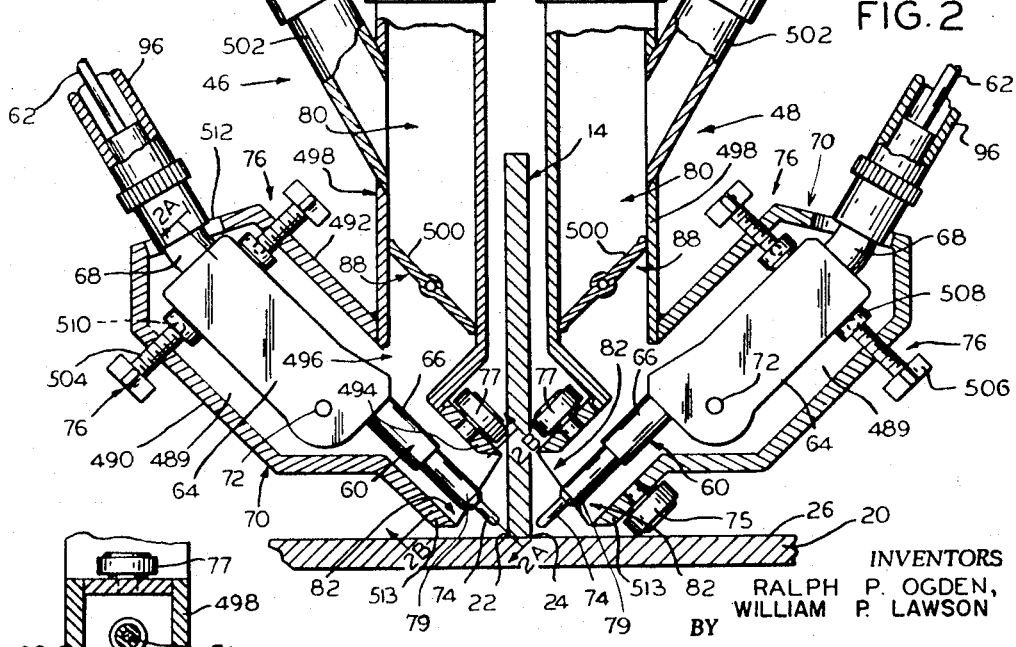
FIG. 2A
FIG. 2
FIG. 2B
INVENTORS
RALPH P. OGDEN,
WILLIAM P. LAWSON
BY
Mann, Brown & McWilliams
ATTORNEYS INVENTORS
RALPH P. OGDEN
WILLIAM P. LAWSON
BY
Mann, Brown & McWilliams
ATTORNEYS

United States Patent Office 3,444,352
Patented May 13, 1969

3,444,352
ADJUSTABLE WELDING HEAD ARRANGEMENT
Ralph P. Ogden, Park Forest, Ill., and William P. Lawson, Hammond, Ind., assignors to Ogden Engineering Corporation, Schererville, Ind., a corporation of Indiana
Continuation-in-part of application Ser. No. 589,651 Oct. 26, 1966. This application June 12, 1968, Ser. No. 748,143
Int. Cl. B23k 9/12
U.S. Cl. 219—125                                             18 Claims

ABSTRACT OF THE DISCLOSURE

The disclosure relates to a dual welding head arrangement for welding machines of the automatic type that is especially adapted for welding stiffener plates to fabricated I-beams and the like structures. The basic head arrangement is disclosed in submerged arc and gas shielded forms and is in the form of a pair of welding heads for simultaneously welding each fillet which are adjustably secured to a floating support structure that permits the heads to float laterally of both the stiffener and the plate being reinforced, respectively, with each head being in the form of a housing in which is pivoted a body of electrically insulating material in which the nozzle for the welding wire is embedded in insulated relation with respect to the housing. A screw type adjustment device is interposed between each housing and insulating body of each head for adjusting the discharge end of the nozzle of each head relative to the fillet that is to be welded, independently of the guiding system for the head arrangement.

---

Figure 4:
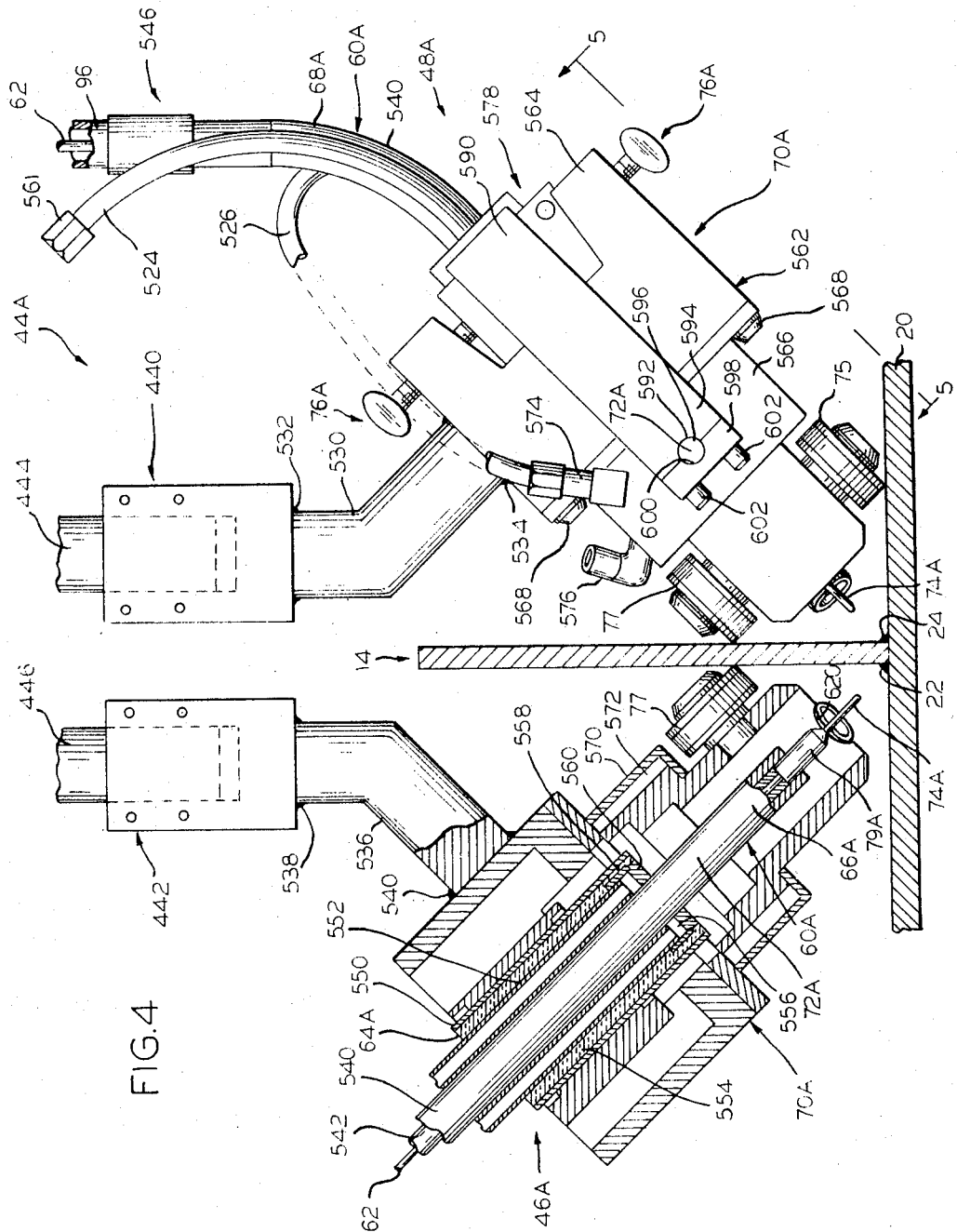

The head arrangement is supported by a roller that rides on the plate being reinforced, and each head housing includes a roller that bears against the stiffener plate when the heads are applied thereto for welding purposes, with the arrangement being such that the rollers involved are disposed as close as possible to the plate surface portions that should control the guiding movement of the heads.

This application is a continuation-in-part of our copending application Ser. No. 589,651, filed Oct. 26, 1966, now abandoned, which is a continuation-in-part of our copending application Ser. No. 323,820, filed Nov. 14, 1963, now Patent No. 3,325,625, granted June 13, 1967.

This invention relates to apparatus and devices for welding stiffeners to frabricated I-beams, and more particularly, to dual welding head or torch arrangements for simultaneously fillet weding both sides of the stiffener to the beam web.

Fabricated I-beams of a size appropriate for use as girders in the construction of bridges ordinarly require the application thereto of stiffener or reinforcing plates on both sides of the beam and between its ends flanges.

These stiffener plates (or stiffeners as they are known in the art) are customarily welded to the web and extend between the end flanges of the beam, which end flanges may be spaced apart as much as 96 or more inches, depending upon the stress the beam is designed to withstand.

The welding of the stiffeners customarily is performed after the fabrication of the I-beams has been substantially completed and the beams positioned to rest on their end flanges, so that ready access may be had to the beam web, which is then horizontally disposed. After the stiffeners have been applied as desired to one side of the beam, the beam is turned over and the operation repeated to apply the stiffeners to the other beam side.

Heretofore the stiffener plates have been fillet welded in place by using manually operated welding equipment, or at the best, semi-automatic welding equipment. In both types of equipment, the operator must follow the joint manually, and, as the type of weld involved in connection with the application of stiffeners to fabricated I-beams is uncomfortable to make, work output tends to be quite limited.

However, it has not yet proved feasible to weld the stiffener plates with automatic equipment because the welding heads or torches must follow the contours of the stiffener and the beam web (which usually are not straight), and the fillet weld must go as close to the end flanges as possible. Furthermore, control of the flux application as to height is required if undue flux waste is to be avoided.

Moreover, the providing of equipment that would satisfy all these requirements would additional encounter the problem of fitting all the necessary equipment into permissible space requirements.

Automatic welding equipment available prior to this invention has not yet satisfied these requirements, and, consequently, the application of stiffeners to fabricated I-beams has continued to be done on manual basis, until the development of this invention and that of our said patent.

A principal object of this invention is to provide apparatus for fillet welding stiffeners to fabricated beams that puts the actual welding involved on a substantially automatic basis.

Another principal object of this invention is to provide a horizontally and vertically floating dual welding head or torch arrangement for simultaneously and automatically welding both sides of the stiffeners to the beam web.

Other objects of the invention are to provide a novel welding head arrangement in both submerged arc and gas shielded arc welding forms which provides for adjustment of the welding wire with respect to the head, and which, in one form, permits the welding head to position the welding wire closely adjacent the beam end flange so that the fillet weld involved extends as closely as practical to the beam end flange, and to provide apparatus of the type described that is economical of manufacture, convenient to use, and susceptible of wide utility in the welding field.

Still other objects, uses, and advantages will become obvious or be apparent from a consideration of the following detailed description and the application drawings (in which the same reference numerals are used as those employed in our said patent for the common subject matter involved.)

Figure 6:
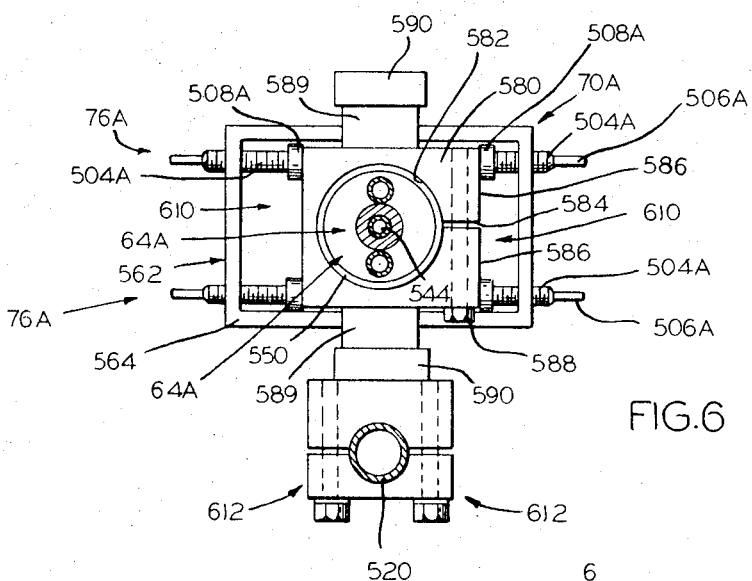
Figure 5:
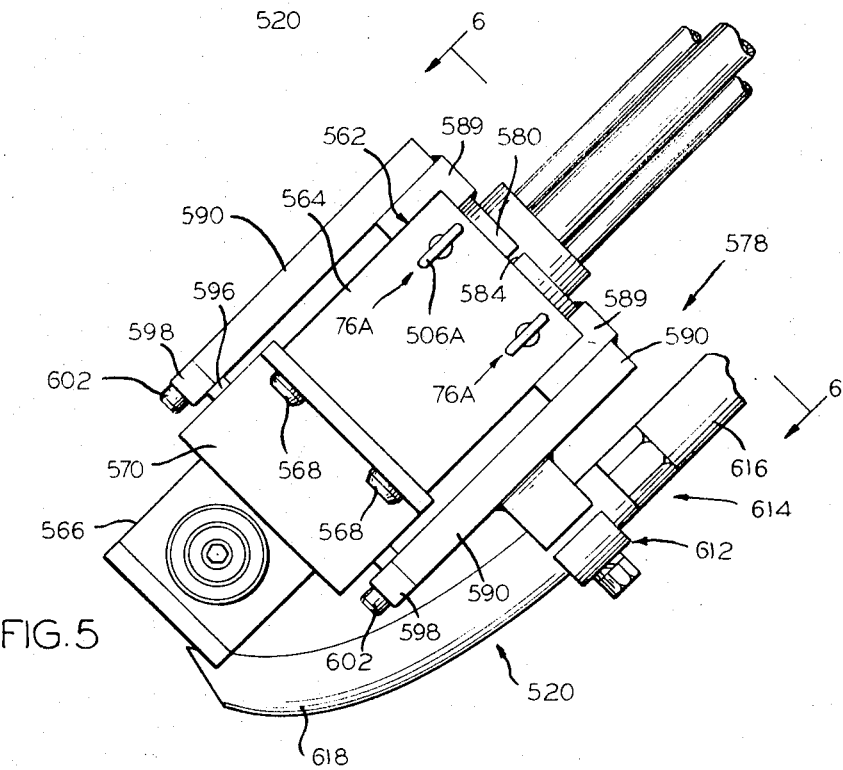

In the drawings:
FIGURE 1 is a diagrammatic perspective view illustrating the apparatus of our said patent applied to a fabricated I-beam in accordance with our invention to fillet weld stiffeners to the beam web, with the dual welding head arrangement thereof being of the submerged arc type and being shown in a partially lowered position and in its retracted position with respect to the machine bridge;
FIGURE 1A is a small scale diagram of said apparatus showing the principal parts thereof;
FIGURE 2 is an enlarged fragmental side elevational view of the dual welding head arrangement forming a part of the apparatus shown in FIGURE 1, with parts being shown in section and other parts being broken away;
FIGURES 2A and 2B are sectional views along lines 2A—2A and 2B—2B, respectively, of FIGURE 2;
FIGURE 3 is a fragmental diagrammatic elevational view illustrating the connection employed between our dual welding head unit and its support;
FIGURE 4 is a view similar to that of FIGURE 2 illustrating a gas shielded arc welding head embodying the teachings of this invention;
FIGURE 5 is a bottom plan view of one of the welding heads shown in FIGURE 4, taken substantially along line 5—5 of FIGURE 4; and FIGURE 6 is a sectional view taken along line 6—6 of FIGURE 5.

However, it is to be distinctly understood that the specific drawing illustrations provided are supplied primarily for purposes of complying with the requirements of 35 U.S.C. 112, and that the invention may take other embodiments that will be obvious to those skilled in the art and that are intended to be covered by the appended claims.

*General description*

Reference numeral 10 of FIGURE 1 generally indicates a successful embodiment of our invention applied to a fabricated I-beam 12 for the purpose of welding a stiffener 14 thereto, employing the submerged arc procedure.

The I-beam 12 generally comprises a pair of elongated plates 16 and 18 welded to a plate 20 to define the usual I-beam configuration whereby the plates 18 and 16 form the end flanges of the I-beam and the plate 20 forms its web.

As already indicated, fabricated I-beams 12 of the type that are to be used for bridge girders and the like ordinarily require the application thereto of stiffeners 14 between the end flanges 18 and 16, and which are welded to the web 20. It has long been the practice in applying the stiffeners 14 to the beams 12 to place the beams 12 so that their end flanges 16 and 18 are disposed vertically, thereby disposing the web 20 in a horizontal position so that the stiffeners 14 may be conveniently placed on top of the web between the flanges 16 and 18 and welded in place along fillets 22 and 24 that are defined where the stiffener is placed against the upwardly facing surface 25 of the web 20.

As already explained, one reason this particular welding task has continued to remain on a manual basis is that the fillets 22 and 24 must be carefully followed during the welding process in order to securely weld the stiffener to the web. As the web 20 and the stiffener 14 usually are not straight, the fillets 22 and 24 may vary vertically and horizontally accordingly.

Furthermore, when the stiffeners 14 are initially put in place, as by tack welding, they frequently are not exactly square with the flanges 16 and 18, which means that the fillets 22 and 24 may extend at an angle with respect to the flanges 16 and 18 that is slightly under or over 90 degrees.

Furthermore, very often the fillet welds at fillets 22 and 24, to meet acceptable welding standards, must reach as closely as possible to the flanges 16 and 18.

Machine 10 comprising a preferred arrangement of one embodiment of our invention meets all these requirements and for the first time makes practical the automatic fillet welding of stiffeners 14 to fabricated beams 12.

The machine 10, as disclosed in our said patent, comprises a bridge 26 mounted on trucks 28 having wheels 30 at each end thereof which ride on the upwardly facing edges 32 of the beam end flanges 16 and 18 when the beam 12 is turned on its side following the usual procedure for stiffener application.

Mounted in the bridge 26 for movement longitudinally of the bridge and laterally of the beam 12 is a trolley 34 having fixed thereto a cantilever support member 36 on which is mounted a carriage 38 that is mounted for free floating movement longitudinally of the support member 36. The support member 36 extends perpendicular to the bridge 26, and thus when machine 10 is applied to a beam 12 in the manner indicated in FIGURE 1, the support member 36 lies in a vertical plane that extends longitudinally of the beam 12.

The carriage 38, which is more fully illustrated in FIGURES 4, 5 and 8 of our said patent, has connected thereto for free floating movement vertically thereof an elongated upright member or beam 40, which has secured to its lower end portion 42 (see FIGURES 1 and 3) the dual welding head arrangement or unit 44, that forms the general subject matter of the present application, and comprises a pair of novel narrow, planar or flat, welding heads or torches 46 and 48.

As indicated in FIGURES 1 and 3, the planar heads 46 and 48 are connected to the lower end of the beam 40 by a fabricated connector structure or welding head mounting device 50, which includes a pivotal connection for the torch 46 to the connector structure 50 as at 52 and a screw clamp device 54 for swinging the torch 46 about its pivotal connection 52 into engagement with the stiffener. To adjust for different nominal thicknesses of stiffeners so torch 46 will not be tilted out of proper position, the torch 48 may be moved toward or away from the pivotal connection 52 by appropriately operating the connector device 56 (see FIGURE 3) that connects it to the connecting structure 50.

As indicated in FIGURE 2, the welding heads or torches 46 and 48 each further comprise a welding wire or electrode nozzle 60 through which welding wires 62 are fed for application to the fillets 22 and 24. In accordance with this invention, the nozzles 60 are embedded in bodies 64 formed from an electrically insulating material (preferably an insulating epoxy resin), with the ends 66 and 68 of the nozzle extending outwardly of the respective bodies 64. The bodies 64 are mounted within narrow and flat or planar housings 70 to pivot relative to the housings about axes 72, whereby the welding wire tips 74 may be adjusted with respect to the fillets 22 and 24 for any particular stiffener application. Ends 66 include nozzle tips 79 from which wire tips 74 protrude.

The bodies 64 in the illustrated embodiment may be adjusted about their pivotal axes 72 by employing screw devices 76. These two opposed screw devices constitute a single screw micrometer type adjustment means with sometimes one screw and sometimes the other screw being the adjusting screw, with the opposing screw pressure only being relieved and, after the adjustment is completed, reapplied to lock the body 64 in the new position.

The housings 70 are formed to define a flux receiving chamber 80 which communicates with a flux discharge opening 82 defined by the housings, and in which the welding wire tips 74 are disposed. Appropriate conduits 83 and 84 (including flexible portions 85 and 87, respectively) connect the respective flux receiving chambers 80 with hopper 86 that is secured in any suitable way to the carriage 38. The hopper 86 is arranged in the manner indicated in FIGURES 13 and 14 of our said patent to supply flux to the torches 46 and 48 by gravity flow, which flow may be controlled by appropriate valve devices 88 (see FIGURE 2) associated with the respective welding torches, or in any other suitable manner.

The housing of head 48 includes a roller 75 that engages the beam web to support the welding head arrangement 44 for movement on the web, and both housings 70 include a roller 77 positioned to engage the stiffener in the operating position of the head arrangement 44. It will be noted that rollers 75 and 77 are rotatable about axes lying in the plane of heads 46 and 48 and that these axes are disposed substantially normally of the respective welding wire feed paths of said heads; the structural relation indicated places guiding rollers 75 and 77 both close to the weld joint and in alignment with the welding arcs, while at the same time the angled corners of the cylindrically shaped rollers 75 and 77 make for firm contact with the beam web and stiffener even with granular welding flux present.

The machine 10 includes an appropriate drive mechanism for moving the trolley 34 with respect to the bridge 26, and an arrangement for feeding the welding wires to the dual welding heads. Examples of suitable mechanisms for achieving these purposes are shown in FIGURES 11 and 12, respectively, of our said patent.

Further, in accordance with out invention, the bridge 26 is releasably secured to the respective trucks 28 by releasable clamping devices 90 so that the trucks 28 can be selectively shifted longitudinally of the bridge to accommodate beams 12 of different depths.

The welding wires are carried on the trolley 34 by being applied to a pair of reels 92, and the dual welding wire feed arrangement shown in FIGURE 12 of our said patent draws the welding wires off the respective reels and feeds them through identical electrical contacts (shown at 94 in our said patent) and into the respective insulating conduits 96 through which they pass to the respective welding heads or torches. A suitable source of welding current is made available in a conventional manner the contacts, and the wiring of the machine 10 is preferably such that when the machine welding circuit is turned on, the welding wires are simultaneously energized and actuated for fillet welding application to fillets 22 and 24. Insulating conduits 96 are conventional and include copper cable which is electrically connected between the contacts and the respective head nozzles 60 for transmitting the current to the welding wire at the nozzles as well as along the length of conduits 96 by reason of the copper cable being in electrical contact with the coiled spring liner that customarily forms the guideway for the welding wire through the respective conduits 96.

When the machine 10 is initially mounted on the beam 12, the heads or torches 46 and 48 should be positioned above the level of the stiffeners, and for this purpose, handle 98 is applied to the floating beam 40 to enable the operator to so position the torches, after which the beam may be locked in this position by actuating; for instance, the clamp lock device 99 shown in FIGURES 4–7 of our said patent, or the gravity actuated bail type latch shown in FIGURES 15 and 16 of said patent. A similar clamp lock device 10 is carried by the carriage 38 to lock the carriage against movement longitudinally of the support member 36, or a thumb screw, mounted in carriage 38, can be used to bear against the support member 36 for the same purpose.

In use, the machine 10 is applied to a beam 12 in substantially the manner indicated in FIGURE 1, with the rollers 30 of trucks 28 riding on the upwardly facing edges 32 of the end flanges 16 and 18 after the beam has been turned over on its side.

The stiffeners 14 are then spaced along the length of the beam 12 in the usual manner, and may be tack welded in their desired position of installation.

The machine 10 is then moved longitudinally of the beam 12, as by the operator grasping the bridge 26 and moving it longitudinally of the beam, to position the torches 46 and 48 adjacent the stiffener.

The operator then operates screw device 54 (see FIGURE 3) to move it away or space it from head 46, and then he grasps head or torch 46 (which is then free to move) and swings it away from torch 48; after unlocking the latching devices 99 and 100, he lowers the floating beam 40 to dispose the stiffener between the torches 46 and 48 and rest the heads or torches, as well as beam 40, on roller 75 of head 48.

The screw clamp device 54 is then operated to bring it into engagement with the torch 46 to swing torch 46 towards the torch 48 as required to bring the roller 77 of head or torch 46 into engagement with the stiffener 14 and also draw the roller 77 of the torch or head 48 against the opposites side of the stiffener 14.

When this is completed, the operator should be sure that the welding wire tips 74 are correctly directed into the fillets 22 and 24. As the vertical and horizontal legs of the fillet weld must be substantially equal, the tips 74 of the welding wires must be suitably disposed with respect to the stiffener and web. In accordance with our invention, this is achieved by employing the screw devices 76 to pivot bodies 64 about their pivotal axes 72 as necessary to achieve the desired positioning of the welding wire tips.

It is then merely necessary to position the welding head housings in abutting relation with one of the end flanges 16 or 18, open the flux valves, and turn on the welding machine to start the welding operation as well as motion of the trolley 34 with respect to the bridge toward the other end flange. As the welding proceds, the torches 46 and 48 simultaneously apply a fillet weld along the respective fillets 22 and 24, while at the same time the torches 46 and 48 are permitted to shift horizontally and vertically in planes normal to both the web and the stiffener by the nature of the connections between the floating beam 40, the carriage 38, and the support member 36.

As indicated in FIGURE 1, the torches 46 and 48 are quite flat and thin in transverse configuration and preferably the proportioning of parts is such that when a side surface 110 of a welding head housing 70 is positioned in abutting relation with an end flange 16 or 18, the tip of the welding wire 74 is disposed no more than an inch from the said end flange. All parts of the heads that are to be disposed below flange end surfaces 32 in the operative position of head arrangement 44 should not have a thickness so large as to prevent welding adequately close to the flanges. The side surface 110 shown in FIGURE 1 for each head is present on the reverse side of each head.

When the welding operation is completed, the welding machine is turned off, the flux valves closed, and the operator operates the screw clamp device 54 to permit the torch 46 to be swung away from the stiffener, and then he uses handle 98 to lift the torch arrangement 44 above the level of the stiffeners, after which it is locked in that position by employing the latch device 99, for movement to a new location.

It will therefore be seen that we have provided a machine that renders the welding of stiffeners to fabricated I-beams substantially automatic, and yet insures the uniform welding results that are essential in view of the use to which such beams are put. Furthermore, this is achieved while insuring a fillet weld that extends to an acceptable limit towards the end flange, while still meeting the space requirements imposed upon apparatus of the type under consideration.

FIGURES 4–6 illustrate the principles of this invention embodied in a welding head arrangement or unit 44A that is adapted for gas shielded arc welding, which comprises heads or torches 46A and 48A that are connected to the lower end of beam 40 (not shown in these figures) in the same manner as heads 46 and 48. Heads 46A and 48A each comprise welding wire or electrode nozzle 60A through which welding wires 62 are fed for application to the fillets 22 and 24. The nozzles 60A are embedded in bodies 64A formed from an electrically insulating material (preferably an insulating epoxy resin), with the ends 66A and 68A of the nozzles extending outwardly of the respective bodies 64A. The bodies 64A are mounted within housings 70A to pivot relative to the housings about axes 72A, whereby the welding wire tips 74A may be adjusted with respect to the fillets 22 and 24 for any particular stiffener application. Ends 66A include nozzle tips 79A from which wire tips 74A protrude.

The bodies 64A in the illustrated embodiment may be adjusted about their pivotal axes 72A by employing screw devices 76A. As in the case of screw devices 76, these opposed screw devices constitute a screw micrometer type adjustment means with sometimes one pair of screws and sometimes the other pair of screws being the adjusting screws, with the opposing screw pressure only being relieved and, after the adjustment is completed, reapplied to lock the body 64A in the new position.

Shielding gas, such as carbon dioxide, is supplied to conduit 520 that is carried by the respective housings 70A and has its discharge end 522 appropriately directed at the welding area. Also associated with the respective heads 46A and 48A are coolant conveying tubes 524 and 526 for supplying coolant to the parts of the respective heads indicated in FIGURE 4.

As in the case of head arrangement 44, the housing of head 48A includes a roller 75 that engages the beam web to support the welding head arrangement 44A for movement on the web, and both housings 70A include a roller 77 positioned to engage the stiffener in the operating position of the head arrangement 44A. It will again be noted that rollers 75 and 77 of head arrangement 44A are rotatable about axes lying in the plane of heads 46A and 48A and that these axes are disposed substantially normally of the respective welding wire feed paths of said heads; the structural relation indicated places guiding rollers 75 and 77 both close to the weld joint and in alignment with the welding arcs, while at the same time the angled corners of the cylindrically shaped rollers 75 and 77 make for firm contact with the beam web and stiffener even with granular debris present.

The machine 10 when equipped with head arrangement 44A operates in the same manner as already described, except, of course, gas shielded welding techniques are employed in the manner well known to the art. Tube 524 of each head is secured to a source of coolant while fitting 576 of each head is secured to suitable tubing that conveys off the used coolant.

*Specific description of welding head*

As already indicated, the floating beam 40 of machine 10 at its lower end 42 is affixed to connector structure 50, the structural features of which are indicated in FIGURES 1 and 3. The connector structure 50 is of box-like construction comprising a top member 410, spaced depending side members 412 fixed to either side edge of the top member 410, and a bottom or lower member 414 that is fixed between the lower edge portions 416 of the respective side members 412 so as to span the space between them. The bottom member 414 is formed on either side thereof adjacent the respective side walls 412 with a slot 418 through which the component parts of connector device 56 protrude for the purpose of securing the welding head 48 to the connector structure 50.

Pivotal connection 52 of the welding head 46 comprises a pin 420 that is removably mounted in any suitable manner in the side walls 412.

The screw device 54 for actuating the welding head 46 to pivot same about pin 420 is supported by a downwardly inclined or angled portion 422 of the top plate 410, which is internally threaded as at 424 to threadedly receive screw member 426 provided with an appropriate handle portion 428 and a head portion 430 that engages the abutment surface 431 of the welding head 46. Threaded member 426 is swivelably secured to the head 430 by an appropriate ball and socket type universal joint arrangement generally indicated at 432, to allow the necessary pivoting movement between the head 430 and the screw member 426 as the welding head 46 is moved about pin 420 to close head 46 against the stiffener.

The welding heads 46 and 48 are secured to the connector structure 50 by clamp devices 440 and 442 (see FIGURE 2) cooperating with the respective suspension bars 444 and 446.

The clamp devices 440 and 442 are identical in construction and comprise bar members 448 and 450 that are drilled as at 452 and 454, respectively, to receive the lower ends of the respective suspension bars 444 and 446, respectively. The respective bars 448 and 450 are split axially of the respective bores 452 and 454 down to approximately the level of the bottoms 456 of the respective bores 452 and 454, and the resulting clamping portions that are so defined are drilled and tapped to receive appropriate screws 458 so that when the lower ends of the respective suspension bars 444 and 446 are received in the respective clamp devices 440 and 442, they may be clamped in place in the desired positions of adjustment longitudinally and rotationally of the suspension bars 444 and 446.

The suspension bar 444 of the welding head 48 has affixed to its upper end a flange plate 460 (see FIGURE 3) and the flange plate 460 is connected to a slide bar 462 that is mounted within connector structure 50 and on top of bottom plate 414, as by the spaced pairs of bolts 464 (only one pair is shown) extending through the respective slots 418, to secure the welding head 48 to the connector structure 50. Ordinarily, the bolts 464 and their respective nuts 466 will be operated to clamp the welding head to the connector structure 50 in a desired position of adjustment longtiudinally of the slots 418, but, by loosening the nuts 466, the welding head 48 may be adjusted longitudinally of such slots 418.

The suspension bar 446 of the welding head 46 has affixed to its upper end flange plate 470 which has affixed in turn to its upper surface a pivot structure 472 comprising a fabricated structure including plate 474 having welded to the top thereof a sleeve 476 (that receives pin 420) and ap late 478 that bears the abutment surface 431 against which the threaded member head 430 is to engage.

The plate 474 is drilled and tapped to receive appropriate bolts 480 that are in turn received through the flange plate 470 for the purpose of securing the welding head 46 to the pivot structure 472.

The housings 70 of the welding heads comprise (see FIGURE 2) hollow fabricated structures made up from sheets of a magnetic material, such as iron or mild steel to define the generally flat planar shape indicated in FIGURE 1 including the relatively wide and flat side surfaces 11 on either side thereof that are vertically disposed when the welding heads are mounted in their operative positions on the machine 10. However, non-magnetic materials may be used to form housings 70 if one is concerned only with mechanical performance.

The side surfaces 110 are defined by relatively wide and flat side walls 489 that are separated by and affixed to each other as by welding edge pieces 490, 492 and 494 having the general configurations illustrated in FIGURE 2, and, as already indicated, the edge pieces 490, 492 and 494 should be proportioned such that, when the side surface 110 of the housing is positioned adjacent one of the beam end flanges 16 or 18, the tip 74 of the welding wire is disposed within an inch of the beam end flange. Thus, the housings should have a tranverse dimension or thickness no greater than about two inches (assuming that the wire tips are centrally located in housing 70) and, in an operating embodiment, the outside transverse dimension does not exceed 1¼ inches. If the I-beam end flanges are to be contacted by clamp devices 440 and 442, the latter should not exceed 1¼ inches in width.

The edge wals 492 and 494 are spaced from each other to define a flux inlet opening 496 in which is secured by welding a tubular structure 498 that defines the respective chambers 80 of the welding heads. Pivotally mounted within the tubular structures 498 are butterfly valve members 500 that comprise the valve devices 88, and any appropriate arrangement may be employed for positioning and holding the butterfly valve members 500 in fully opened or closed position of adjustment to permit the flux flow through the welding heads, such as flat handles 501 (see FIGURE 1) that rest against pins 503 to dispose members 500 at a desired position of adjustment. In the open position of valve members 500, the flux pile at the bottom end of nozzle portion 513 acts as an automatic "demand" valve to stop the flux flow when it reaches the nozzle end and feeding faster or slower as the welding speed is made fast or slower. Thus, the need for positioning valve members 500 in positions intermediate their full open and closed position is eliminated.

The upper ends of the tubular structures 498 are fixed as by welding to the lower ends of the clamping devices 440 and 442, respectively, and each tubular structure 498 includes a diagonally extending conduit member 502 to which flexible portions 87 and 85 of the respective flux conduits 84 and 83 are connected.

The edge plates 490 and 492 of housings 70 are respectively threaded to receive screw members 504 that make up the screw devices 76. The screw devices 76 further comprise appropriate handles 506 and head 508 which bear against the respective bodies 64, and as in the case of the screw device 54, and appropriate type of ball and socket universal joint connection indicated at 510 is employed between the respective threaded members 504 and the heads 508. In alternate arrangements, the screw device 76 on one side of the housing 70 is eliminated and either a compression spring is interposed between that side of the respective bodies 64 and housing edge plates 490 or 492, so that only one screw device adjusts the nozzle of a particular head against the bias of the opposing compression spring, or the head 508 of the remaining screw device 76 is bonded to the body 64 so that the single screw device 76 will provide both a pulling and a pushing action on the body 64.

The edge plate members 490 and 492 of housings 70 at the upper ends of the respective housings 70 are formed to define openings 512 through which the welding wire 62 and its associated components pass, and at the lower ends of the housings, the pieces 490 and 494 are spaced apart to define opening 82 and housing nozzle portion 513. Openings 512 are made of sufficient dimension in the plane of the respective heads to accommodate the desired adjustment of the respective nozzles, as previously described. As indicated in FIGURE 2, openings 512 are well above the pile angle of the flux passing through the respective heads, which eliminates seal requirements at openings 512.

The bodies 64 of housings 70 are pivotally secured in place by appropriate pins that form pivots 72. As the housings are thus insulated from the nozzles 60, and screw devices 76 bear against insulating bodies 64, the position of the welding wire tips may be adjusted with respect to the fillets during the welding operation, if necessary.

The rollers 75 and 77 may be of any conventional type journaled in place on the housings in any suitable manner substantially in the positions indicated in FIGURE 2, and are journaled to rotate about axes that are disposed substantially perpendicular to the weld wire tips of the respective heads.

It may be pointed out that in normal operation of apparatus 10, the welding heads 48 and 46 will be positioned sufficiently far along support member 36 outwardly of the bridge 26 to be disposed in advance of the truck wheels 30 so that the side surfaces 110 of housings 70 or flat handles 501 may be positioned flush with the inside surfaces of the beam end flanges 16 and 18.

The magnetic nature of housings 70 is a significant feature of the invention as the magnetic field developed by the welding current passing through the welding wires is concentrated in the welding head housings in circumambient relation about the respective welding wires which produces an increase in the density of lines of force between the arc and the side of the housing toward which the arc might move and a decrease in the density of lines of force and the side of the housing nozzle which the arc would be moving away from. By the Motor Rule, this should produce a force tending to center the arc which should make it less subject to the effect of stray magnetic fields set up by the ground circuit and other arcs. Also, by largely confining the magnetic field about the arc to the nozzle region, the effect of the arc on any other arcs should be reduced. Such stray magnetic fields are thought to be the cause of arc blow and this centering feature may make it practical to make tandem welds with two or more D.C. arcs (which situation is, at present, subject to severe arc blow and arc deflection).

Referring now to the embodiment of FIGURES 4–6, the heads 46A and 48A are secured to the connector structure 50 by the clamp devices 440 and 442 that, in the form shown, are the same as shown in FIGURE 2, and that cooperate with the respective suspension bars 444 and 446. Clamp device 440 is fixed to the housing 70A of head 48A by securing angle member 530 between the two, as by welding at 532 and 534, respectively. Similarly, the clamp device 442 is secured to the housing 70A of head 46A by angle arm 536, as by welding at 538 and 540, The nozzles 60A are each in the form of a removable nozzle assembly comprising a tube 540 formed from a suitable electricity conducting material such as copper, provided with a tubular insert 542 formed from a suitable wear resistant material, such as steel, through the bore 544 of which the welding wire 62 passes. Tube 542 terminates short of the discharge end of tube 540 and nozzle tip 79A is applied to the latter as indicated in FIGURE 4.

Tube 540 is provided with a suitable electrical connection device where indicated at 546, such as a suitable brass fitting, for purposes of supplying welding current to the respective heads, to which insulating conduit 96 from the reel 92 supplying the head in question is removably attached in any suitable manner.

The nozzle tube 540 is received within a steel liner or jacket 550 together with the coolant discharge end 552 of tube 524 and the coolant intake end 554 of tube 526, the latter tubes communicating at an annular chamber 556 that is defined by sleeve 558, lower disc 560, and an upper disc (not shown) into which tubes 525 and 526 extend which separates the material forming body 64A from chamber 556. Sleeve 558 and the upper and lower discs associated with same are secured together and to the tubes 540, 524 and 526 in any suitable manner to make the chamber 556 liquid tight. The epoxy resin material forming body 64A completely fills the space between tube 540 and its jacket 550 for the full length of the jacket 550; such material also separates the sleeve 558 and tubes 524 and 526 from jacket 550 so that the nozzle 60A is insulated from its jacket 550 from an electrical standpoint. The tubs 524 and 526 (which are shown in the sectional view of the left hand side of FIGURE 4 rotated 90 degrees from their positions at the right hand side of the same figure for ease of illustration) may be formed from electrically conducting or insulating material, and tube 524 is provided with a fitting as at 561 for attachment to a suitable hose (not shown) formed of electrically insulating material that is connected to a source of coolant, such as tap water, when the apparatus is in use.

The housings 70A each comprise a tubular structure 562 defining and upper section 564 and a lower section 566 that are bolted together in any suitable manner, as by employing bolts 568. The lower section 566 is jacketed as at 570 to define annular chamber 572 about the housing section 566 for cooling purposes. Tube 526 is connected to chamber 572 by fitting 574 while fitting 576 is provided to connect a suitable coolant discharging tube (not shown) that conveys used coolant to a suitable point of disposal or cooling for reuse and that preferably is made of electrically insulating material.

Pivotally mounted within the housing section 564 of each head is a bracket structure 578 to which the respective nozzle 60A are releasably secured for operation in accordance with this invention. The bracket structure 578 comprises a block element 580 that is bored as at 582 (see FIGURE 6) to receive the nozzle jacket 550, and that is split lengthwise thereof (on one side thereof) as at 584 to define block clamping portions 586 that may be clamped against the nozzle jacket 550 by applying suitable bolts 588 therebetween to draw portions 586 together.

As indicated in FIGURE 5, the block 580 has secured to either side thereof, as by welding, a pair of shoulder members 589 which have fixed to same depending arm members 590, which are notched as at 592 (see FIGURE 4) at their lower ends 594 to receive the respective pivot pins 596 that are respectively fixed in any suitable manner to the lower housing section 566 on opposite sides thereof (see FIGURE 5). Applied to each arm 590 is a cap member 598 that is likewise grooved at 600 to receive the respective pivot pins 596, with the respective caps 598 being held in place on the respective ends 594 by suitable screws 602. Thus, the application of cap members 598 to the respective arm 590 of the welding head bracket structure for each head pivotally mounts the respective bracket structures for pivotal movement about the indicated axis 72A of the respective heads.

As indicated in FIGURE 6, the section 564 of each housing 70A is proportioned to provide the adjustment space 610 that is indicated on either side of the bracket structure 578 to permit the adjustment of the nozzle that is contemplated by this invention to properly locate welding wire tip 74A.

The screw devices 76A are the same as screw devices 76, each comprising a threaded member 504A having an appropriate handle 506A and an appropriate head 508A which bears against the adjacent surfaces of the respective blocks 580. As in the case of screw devices 76, an appropriate type of ball and socket universal joint connection may be employed between the respective threaded members 504A and heads 508A that comprise the screw devices 76A.

While two pairs of opposing screw devices 76A have been illustrated for each of the respective heads 46A and 48A, a single opposing pair would be satisfactory under most operating conditions.

As indicated in FIGURE 5, one of the bracket structure arms 590 has secured thereto a suitable clamp device 612 for holding the gas conveying conduit 520 in place. Conduit 520 is provided with a suitable fitting as at 614 for connection to a suitable gas supplying hose 616, and conduit 520 preferably is given the configuration indicated in FIGURE 5 at its discharge end 618 for directing the shielding gas at the arc defined by the respective heads. The lower housing section 566 of each housing 70A is notched as at 620 (see FIGURE 4) to accommodate the appropriate positioning of the gas tube with respect to the arc, as indicated in FIGURE 5.

When the individual nozzles 60A are applied as indicated in FIGURE 4, the welding heads operate in the manner indicated to provide the adjustability that has been described. The shielding gas supplying tube 520 in being fixedly connected to the respective bracket structures 578 has a permanently fixed position of operation with respect to the arc, and the gas flow from same is proportioned to provide the necessary gas shielding action regardless of the position of welding wire tip 74A within its permissible range of movement relative to the respective fillets 22 or 24.

The electrical resistance offered by the coolant is far too great compared to the low resistance through the tube 540, welding wire 62 and the arc for the direct exposure of the coolant to the tube 540 to be of any significant safety hazard, as is well known in the art.

Nozzle units 60A after long usage will require replacement due to the wear on tubes 542, and in the embodiment of FIGURES 5–6, replacement is very readily accomplished by releasing the used nozzle 60A from the permanently mounted bracket structure 578 and applying a new one to same, by appropriately opening and closing the clamping portions 586 of block 580.

The nozzle units 60A may also be formed to provide for the feeding of a pair of welding wires 62 therethrough so as to be twin wire welding heads, as may be done by appropriately shaping tube 540 and 542. The twin wire head arrangement offers the advantage that, by rotating the respective nozzle units involved on releasing the respective bracket structures 578 involved, the dual welding wire 580s may be positioned as desired to shape the arc; furthermore, the second welding wire per nozzle unit provides for the bringing of more weld metal into the pool.

It will therefore be seen that the head arrangement or unit 44A of FIGURES 4–6 not only provides in a gas shielded arc welding head the basic advantages of our invention, but also provides for ready replacement of used nozzles as well as cooling of the head during operation.

*Distinguishing characteristics of the invention*

It will therefore be seen that we have provided a welding apparatus or machine that for the first time will permit a practical automatic welding operation to be applied to stiffeners for reinforcing fabricated I-beams. Our machine also includes a number of adjustability features that permit it to be readily applicable to the various sizes of such beams that may require stiffeners of the type indicated.

The dual welding head arrangement of our machine not only permits simultaneous welding in the area of the fillets 22 and 24, but also permits the welding heads to accurately follow the contours of the fillets, both horizontally and vertically, that will be encountered in practice because of irregularities in the stiffeners and in the I-beam webs, and without changing the position of the welding head nozzles once they are set in their welding positions; this is because welding head unit 44 moves or adjusts as a unit under the action of the guiding rollers, and because the components of the welding head unit remain in fixed relation to each other during the welding operation. Furthermore, the positioning and relation of the welding head unit guide rollers bring the guiding action of the welding heads as close as feasible to the surfaces that should control the position of the heads relative to the fillets.

Furthermore, the welding heads are adjustable to accommodate varying stiffener thicknesses and to independently position the respective welding wire tips with respect to the fillets that are to be welded.

As previously indicated, one of the major difficulties encountered with prior welding arrangements for automatically welding stiffeners 14 in place has been in coming within a reasonable distance of the flanges with the weld. Our apparatus or machine, when employing heads arrangement 44, can start the fillet welds involved and finish same within one inch of the respective beam end flanges (one operating embodiment can get to within 5⁄8 inch). A complete weld can be finished by tack welding the stiffeners to the beam web at the flange ends.

While the machine as disclosed is a dual welding head arrangement, either or both heads may be employed for welding purposes at any one time although both welding heads will remain physically associated with the machine unless the non-welding head is in the way, in which case it may be removed and other biasing means supplied.

The machine 10 can be easily moved by one man along an I-beam when mounted on the beam's end flanges substantially in the manner shown in FIGURE 1, and can be conveniently crane lifted between I-beams in any suitable manner.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:
1. A fillet welding head comprising:
  a welding wire nozzle through which a welding wire is to extend for fillet welding purposes,
  said nozzle being embedded in a body of electrically insulating material, with the ends of said nozzle projecting outwardly of said body,
  said nozzle and said body being positioned in a housing formed from magnetic material,
  said housing being formed to define a flux discharged opening,
  said nozzle being positioned in said housing to dispose its welding wire discharge end in alignment with said flux discharge opening,
  means for mounting said body in said housing for pivotal movement relative thereto about an axis ex- tending normally of said nozzle and intermediate said ends of said nozzle, means for pivoting said body with respect to said housing about said axis to adjust the position of said nozzle discharge end laterally of said flux discharge opening, and conduit means for supplying flux to said housing discharge opening.

2. The head set forth in claim 1 wherein:
said housing is planar in configuration and has a lateral dimension transversely of the housing that is on the order of one inch.

3. A welding head comprising:
a welding wire nozzle, through which welding wire is to extend, embedded in a body of electrically insulating material with the ends of said nozzle projecting outwardly of said body,
a housing,
said body and nozzle being received within said housing with said body being pivotally connected to said housing intermediate the ends of said nozzle for pivotal movement with respect to said housing about an axis extending generally crosswise of the path of welding wire movement defined by said nozzle,
said nozzle having a welding wire discharge end and a welding wire received end,
said housing being formed to define a flux discharge opening with said nozzle being positioned in said housing to dispose its said welding wire discharge end in alignment with said flux discharge opening,
and means for adjustably securing said body with respect to said housing in a position to dispose said nozzle discharge end in a desired position laterally of said flux discharge opening,
said adjustable securing means including means for adjusting the position of said nozzle discharge end laterally of said flux discharge opening during the welding operation.

4. The welding head set forth in claim 3 wherein:
said housing is formed with a flux receiving opening adjacent said nozzle welding wire discharge end,
and including off-on valve means cooperating with said opening to open and shut said opening with respect to a source of welding flux in the operative position of said head,
whereby when said head is in its operative position and said valve means admits flux to said housing, the flux flowing from said flux discharge opening acts as demand valve means controlling flux flow from said discharge opening base on movement of said head relative to the work being welded.

5. The welding head set forth in claim 3 wherein:
said housing is planar in configuration.

6. The welding head set forth in claim 4 wherein:
said housing is formed with an opening receiving said nozzle welding wire receiving end which is proportioned to accommodate said adjustment of said nozzle with respect to said housing,
said nozzle receiving opening of said housing being positioned on said housing so that when said head is in operative welding position said nozzle receizing opening is higher than the pile angle of said flux received in said housing through said flux receiving opening.

7. The welding heat set forth in claim 3 wherein:
said housing adjacent said flux discharge opening thereof is formed from magnetic material whereby during operation of said head a magnetic centering action is effected on the welding arc.

8. A welding head unit comprising:
a welding head,
a welding head mounting device carrying said head and adapted for connection to a support to position said head in operative fillet welding position on one side of a plate to be welded to a second plate,
said head comprising:
a welding wire nozzle, through which welding wire is extend, embedded in a body of electrically insulating material with the ends of said nozzle projecting outwardly of said body,
a housing,
said body and nozzle being received within said housing with said body being pivotally connected to said housing intermediate the ends of said nozzle for pivotal movement with respect to said housing about an axis extending generally crosswise of the path of welding wire movement defined by said nozzle,
said nozzle having a welding wire discharge end and a welding wire receiving end,
said housing being formed to define a flux discharge opening with said nozzle being positioned in said housing to dispose its said welding wire discharge end in alignment with said flux discharge opening,
respect to said housing in a position to dispose said nozzle discharge end in a desired position laterally of said flux discharge opening,
said adjustable securing means including means for adjusting the position of said nozzle discharge end laterally of said flux discharge opening during the welding operation,
said head mounting device including a pair of suspension members,
said head being secured to one of said suspension members,
with the other of said suspension members and said head including rollers means for engaging either side of the first plate,
and means for securing said roller means in clamping engagement with the first plate when said head is in operative fillet welding position.

9. The head unit set forth in claim 8 including:
roller means carried by said head and engaging the second plate for supporting said unit on the second plate for movement longitudinally of the first plate when said head is in its operative fillet welding position.

10. The head unit set forth in claim 8 wherein:
said housing is formed with a flux receiving opening adjacent said nozzle welding wire discharge end,
and wherein said head includes a tubular portion secured to said housing in alignment with said housing flux receiving opening,
and means for connecting said head tubular portion to a source of welding flux.

11. A welding head comprising:
a welding wire nozzle, through which welding wire is to extend, embedded in a body of electrically insulating material with the ends of said nozzle projecting outwardly of said body,
a housing,
said body and nozzle being received within said housing with said body being pivotally connected to said housing intermediate the ends of said nozzle for pivotal movement with respect to said housing about an axis extending generally crosswise of the path of welding wire movement defined by said nozzle,
said nozzle having a welding wire discharge end and a welding wire receiving end,
said housing being formed to define a flux discharge opening with said nozzle being positioned in said housing to dispose its said welding wire discharge end in alignment with said flux discharge opening,
and micrometer screw means for adjustably securing said body with respect to said housing in a position to dispose said nozzle discharge end in a desired position laterally of said flux discharge opening,
said adjustable securing means including a screw device interposed between said housing and said body for moving said body about its said pivotal connection to said housing to adjust said nozzle end laterally of said flux discharge opening.

12. The head set forth in claim 11 wherein:
said adjustable securing means further includes a second screw device interposed between said housing and said body in opposition to the first micrometer screw device,
said screw devices acting on said body between said pivotal connection and the other end of said nozzle.

13. A welding head comprising:
a welding wire nozzle, through which welding wire is to extend, embedded in a body of electrically insulating material with the ends of said nozzle projecting outwardly of said body,
a housing,
said body and nozzle being received within said housing with said body being pivotally connected to said housing intermediate the ends of said nozzle for pivotal movement with respect to said housing about an axis extending generally crosswise of the path of welding wire movement defined by said nozzle,
said nozzle having a welding wire discharge end and a welding wire receiving end,
said housing being formed to define a welding wire discharge opening with said nozzle being positioned in said housing to dispose its said welding wire discharge end in alignment with said discharge opening,
and means for adjustably securing said body with respect to said housing in a position to dispose said nozzle discharge end in a desired position laterally of said discharge opening,
said adjustable securing means including means for adjusting the position of said nozzle discharge end laterally of said discharge opening during the welding operation.

14. A fillet welding head for gas shielded arc welding comprising:
a welding wire nozzle through which a welding wire is to extend for fillet welding purposes,
said nozzle being embedded in a body of electrically insulating material, with the ends of said nozzle projecting outwardly of said body,
said nozzle and said body being positioned in a housing,
said housing being formed to define a welding wire discharge opening,
said nozzle being positioned in said housing to dispose its welding wire discharge end in alignment with said discharge opening,
means for mounting said body in said housing for pivotal movement relative thereto about an axis extending normally of said nozzle and intermediate said ends of said nozzle,
means for pivoting said body with respect to said housing about said axis to adjust the position of said nozzle discharge end laterally of said welding wire discharge opening,
and conduit means carried by said body mounting means for supplying shielding gas to said housing discharge opening.

15. A welding head for gas shielded arc welding comprising:
a welding wire nozzle structure, through which welding wire is to extend,
said nozzle structure comprising a welding wire conducting tube embedded in a body of electrically insulating material with the ends of said tube projecting outwardly of said body,
a tubular housing,
said body and nozzle structure being received within said housing with said body being pivotally connected to said housing intermediate the ends of said nozzle structure for pivotal movement with respect to said housing about an axis extending generally crosswise of the path of welding wire movement defined by said nozzle tube,
said nozzle tube having a welding wire discharge end and a welding wire receiving end,
said housing being formed to define a welding wire discharge opening with said nozzle structure being positioned in said housing to dispose its said welding wire discharge end in alignment with said discharge opening,
and means for adjustably securing said body with respect to said housing in a position to dispose said nozzle discharge end in a desired position laterally of said discharge opening,
said adjustable securing means comprising:
a support member positioned in said housing and having said body secured thereto,
means for pivotally connecting said support member to said housing for providing said body pivotal connection,
and means for pivoting said support member with respect to said housing about said axis to adjust the position of said nozzle discharge end laterally of said housing discharge opening.

16. The welding head set forth in claim 15 wherein:
said support member comprises:
a body formed to receive said nozzle structure,
means for releasably securing said nozzle structure to said support member body,
said means for pivotally connecting said support member body to said housing comprising:
a pair of arms secured to either side of said support member and disposed externally of said housing,
said arms being pivotally connected to said housing externally thereof for pivotal movement about said axis.

17. The welding head set forth in claim 15 wherein:
said nozzle structure further comprises:
a tubular jacket in which said body is received,
and tube means embedded in said body adjacent said welding wire conducting tube to which liquid coolant means may be supplied to cool said nozzle during welding,
and means for cooling said housing adjacent said discharge opening thereof during welding.

18. In a welding head including a tubular housing adapted to receive a welding wire nozzle and defining a welding wire discharge opening at one end thereof, a welding wire receiving opening at the other end thereof, means for pivotally mounting the welding nozzle within said housing for pivotal movement with respect to said housing about an axis extending generally crosswise of the path of welding wire movement defined by the nozzle, which axis is intermediate the ends of the housing, and means for adjustably securing the nozzle in a desired position of adjustment with respect to the housing discharge opening,
a nozzle structure therefor adapted to form the said nozzle and comprising:
a welding wire nozzle through which welding wire is to extend and defining said path of movement,
said nozzle being embedded in a body of electrically insulating material with the ends of said nozzle projecting outwardly of said body,
said nozzle having a welding wire discharge end and a welding wire receiving end,
said nozzle being proportioned to be received within said housing and extend between said ends thereof when said nozzle discharge end is disposed adjacent said housing discharge opening and in alignment therewith,
said body including means for operably securing same to said pivotal mounting means in operative relation to said adjustable securing means when positioned in said housing to dispose said discharge end thereof adjacent and in alignment with said housing discharge opening.

References Cited

UNITED STATES PATENTS

| | | | |
|---|---|---|---|
| 2,357,376 | 9/1944 | Baird | 219—125 |
| 2,025,785 | 12/1935 | Southgate | 219—125 |
| 2,432,495 | 12/1947 | Baird | 219—125 |
| 2,439,740 | 4/1948 | Johnson | 219—125 |
| 2,781,441 | 2/1957 | Ballentine et al. | 219—126 |
| 2,836,704 | 5/1958 | Mason | 219—125 |
| 2,911,517 | 11/1959 | Armstrong | 219—125 |
| 2,916,605 | 12/1959 | Lucas | 219—126 |
| 3,072,779 | 1/1963 | Masters et al. | 219—125 |
| 3,167,636 | 1/1965 | Bosteels | 219—125 |
| 3,291,360 | 12/1966 | Linnander | 219—124 |

RICHARD M. WOOD, *Primary Examiner.*

W. D. BROOKS, *Assistant Examiner.*

UNITED STATES PATENT OFFICE
CERTIFICATE OF CORRECTION

Patent No. 3,444,352　　　　　　　　　　　　　　　May 13, 1969

Ralph P. Ogden et al.

It is certified that error appears in the above identified patent and that said Letters Patent are hereby corrected as shown below:

Column 3, line 59, "in" should read -- on --. Column 13, line 50, "base" should read -- based --. Column 14, line 4, after "is" insert -- to --; line 20, after the comma, insert -- and means for adjustably securing said body with --.

Signed and sealed this 5th day of May 1970.

(SEAL)
Attest:

Edward M. Fletcher, Jr.　　　　　　　　　WILLIAM E. SCHUYLER, JR.
Attesting Officer　　　　　　　　　　　　　Commissioner of Patents